United States Patent [19]

Ishii

[11] Patent Number: 5,986,957
[45] Date of Patent: Nov. 16, 1999

[54] SEMICONDUCTOR DEVICE AND APPLIED SYSTEM DEVICE THEREOF

[75] Inventor: Yoshimasa Ishii, Kawasaki, Japan

[73] Assignee: Kabushiki Kaisha Toshiba, Kawasaki, Japan

[21] Appl. No.: 09/014,630

[22] Filed: Jan. 28, 1998

[30] Foreign Application Priority Data

Jan. 28, 1997 [JP] Japan .................................. 9-014002

[51] Int. Cl.⁶ .................................................. G11C 7/02
[52] U.S. Cl. ........................ 365/210; 365/94; 365/189.07
[58] Field of Search ........................ 365/210, 94, 189.07, 365/185.04; 395/186, 188.01; 711/164, 163, 154

[56] References Cited

U.S. PATENT DOCUMENTS

| | | | |
|---|---|---|---|
| 4,812,634 | 3/1989 | Ohta et al. | 235/492 |
| 4,887,234 | 12/1989 | Iijima | 711/173 |
| 5,293,610 | 3/1994 | Schwarz | 365/195 |
| 5,408,672 | 4/1995 | Miyazawa et al. | 395/800 |
| 5,557,743 | 9/1996 | Pombo et al. | 395/186 |
| 5,680,581 | 10/1997 | Banno et al. | 395/186 |
| 5,687,345 | 11/1997 | Matsubara et al. | 365/182.03 |
| 5,704,039 | 12/1997 | Yishay et al. | 395/186 |
| 5,784,537 | 7/1998 | Suzuki et al. | 395/800 |
| 5,825,783 | 10/1998 | Momohara | 371/21.1 |
| 5,826,007 | 10/1998 | Sakaki et al. | 395/183.18 |
| 5,844,990 | 12/1998 | Kokubu et al. | 380/23 |
| 5,860,123 | 1/1999 | Sata | 395/186 |

FOREIGN PATENT DOCUMENTS 3-99532   4/1991   Japan .

*Primary Examiner*—David Nelms
*Assistant Examiner*—Gene N. Auduong
*Attorney, Agent, or Firm*—Oblon, Spivak, McClelland, Maier & Neustadt, P.C.

[57] ABSTRACT

A semiconductor device includes an identification data storing circuit having ROM cells, a dummy data storing circuit having destructive type ROM cells, and a comparing circuit. The identification data storing circuit stores identification data inherent to a semiconductor chip. The dummy data storing circuit stores dummy data which is exclusive with respect to the identification data. The comparing circuit compares and checks data items read out from the above two data storing circuits and outputting the result of comparison.

16 Claims, 7 Drawing Sheets

SEMICONDUCTOR DEVICE AND APPLIED SYSTEM DEVICE THEREOF

BACKGROUND OF THE INVENTION

This invention relates to a semiconductor device such as a one-chip microcomputer used in a mobile communication terminal device such as a portable telephone, for example, and more particularly to a semiconductor device having an inherent number storing circuit.

Generally, when inherent identification information such as number data is attached to a semiconductor device, a method for using a semiconductor device with a built-in ROM (Read Only Memory) and storing inherent number data into the ROM cells contained in the semiconductor device at the time of shipment test is used. Therefore, it is considered that the conventional semiconductor device with the built-in ROM has such a construction that the inherent number data can be easily rewritten after shipment of the semiconductor device.

However, for example, in a case where such a semiconductor device with the built-in ROM is used in a portable telephone, the inherent number is used for calculating the telephone rate and the ROM cells are used for storing the inherent number data, then the inherent number data can be freely rewritten after shipment, and as a result, there occurs a possibility that the telephone system may be dishonestly used by intentionally changing the inherent number.

A dishonest-use preventing method using a dual storage technology for providing two ROM devices on the circuit board of the mobile communication terminal and storing data in each ROM device is disclosed in Jpn. Pat. Appln. KOKAI Publication No. 3-99532.

The above dishonest-use preventing method is intended to prevent dishonest use by utilizing the difficulty of mounting or removing the two ROM devices on or from the circuit board, but the difficulty with the operation is not so serious and the reliability of prevention of dishonest use is relatively low.

As described above, in the semiconductor device having the inherent number storing circuit, the inherent identification data can be relatively easily rewritten after shipment and there occurs a possibility that an applied system device using the semiconductor device may be dishonestly used.

BRIEF SUMMARY OF THE INVENTION

An object of this invention is to provide a semiconductor device and an applied system device thereof in which it is extremely difficult to rewrite inherent identification data after shipment, a safety measure can be taken by giving information to the system side at the time of data readout if the inherent identification data is rewritten by any chance and the possibility that an applied system device of the semiconductor device is dishonestly used can be suppressed.

A semiconductor device of this invention has two data storing circuits each having ROM cells. A complementary combination of storage data items (number data and dummy data) of ROM cell pairs each making one set by using one ROM cell in each of the two data storing circuits is obtained. Each bit of the inherent number data is represented by use of the combination of storage data items of the ROM cell pair making one set and a ROM element of at least one of the paired ROM cells of one set is set in the destroyed state when correct number data is correctly written.

With the above construction, when number data is dishonestly rewritten after shipment of the semiconductor device, both of the paired ROM cells of one set for rewritten bit data are set into the destroyed state so that the result (error signal) of the comparing operation for comparing and checking data items from the two data storing circuits at the time of readout becomes "1".

Therefore, according to the semiconductor device of this invention, it is extremely difficult to rewrite the inherent number after shipment, a safety measure can be taken by giving information to the system side at the time of readout of the inherent number if the inherent number is rewritten by any chance and the possibility that an applied system device of the semiconductor device is dishonestly used can be suppressed.

The semiconductor device of this invention can be realized in the following configuration. That is, the semiconductor device of this invention comprises an identification data storing circuit having ROM cells, for storing identification data inherent to a semiconductor chip; a dummy data storing circuit having destructive type ROM cells, for storing dummy data which is exclusive with respect to the identification data; and a comparing circuit for comparing and checking data items read out from the above two data storing circuits and outputting the result of comparison.

A semiconductor device of this invention comprises a semiconductor device which includes an identification data storing circuit having ROM cells, for storing identification data inherent to a semiconductor chip, a dummy data storing circuit having destructive type ROM cells, for storing dummy data which is exclusive with respect to the identification data, and a comparing circuit for comparing and checking data items read out from the above two data storing circuits and outputting the result of comparison; a group of pads to which signals necessary for writing data into the above two data storing circuits are supplied; and a package member having external terminals, for packaging the semiconductor device assembled with the group of pads; wherein the semiconductor device and part of the pad group are electrically isolated from the external terminals.

A semiconductor device of this invention comprises a semiconductor device which includes an identification data storing circuit having ROM cells, for storing identification data inherent to a semiconductor chip, a dummy data storing circuit having destructive type ROM cells, for storing dummy data which is exclusive with respect to the identification data, and a comparing circuit for comparing and checking data items read out from the above two data storing circuits and outputting the result of comparison; a key input device controlled by the semiconductor device; and dishonest-use preventing means for preventing the operation of fetching a key input signal of the key input device when a comparison output of the comparing circuit indicates that dishonest writing is effected for the identification data storing circuit at the time of initial determination made after the power supply of the semiconductor device is turned ON.

A semiconductor device of this invention comprises a semiconductor device which includes an identification data storing circuit having ROM cells, for storing identification data inherent to a semiconductor chip, a dummy data storing circuit having destructive type ROM cells, for storing dummy data which is exclusive with respect to the identification data, and a comparing circuit for comparing and checking data items read out from the above two data storing circuits and outputting the result of comparison; a display device controlled by the semiconductor device; and dishonest-use preventing means for controlling the display device to display an error when a comparison output of the comparing circuit indicates that dishonest writing is effected for the identification data storing circuit at the time of initial determination made after the power supply of the semiconductor device is turned ON.

A semiconductor device of this invention comprises a semiconductor device which includes an identification data storing circuit having ROM cells, for storing identification data inherent to a semiconductor chip, a dummy data storing circuit having destructive type ROM cells, for storing dummy data which is exclusive with respect to the identification data, and a comparing circuit for comparing and checking data items read out from the above two data storing circuits and outputting the result of comparison; an input/output device connected to the semiconductor device; a system power supply for supplying a power supply voltage to the semiconductor device and input/output device; and dishonest-use preventing means for interrupting supply of the power supply voltage of the system power supply when a comparison output of the comparing circuit indicates that dishonest writing is effected for the identification data storing circuit at the time of initial determination made after the power supply of the semiconductor device is turned ON.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described an embodiment of this invention in detail with reference to the accompanying drawings.

Figure 1:
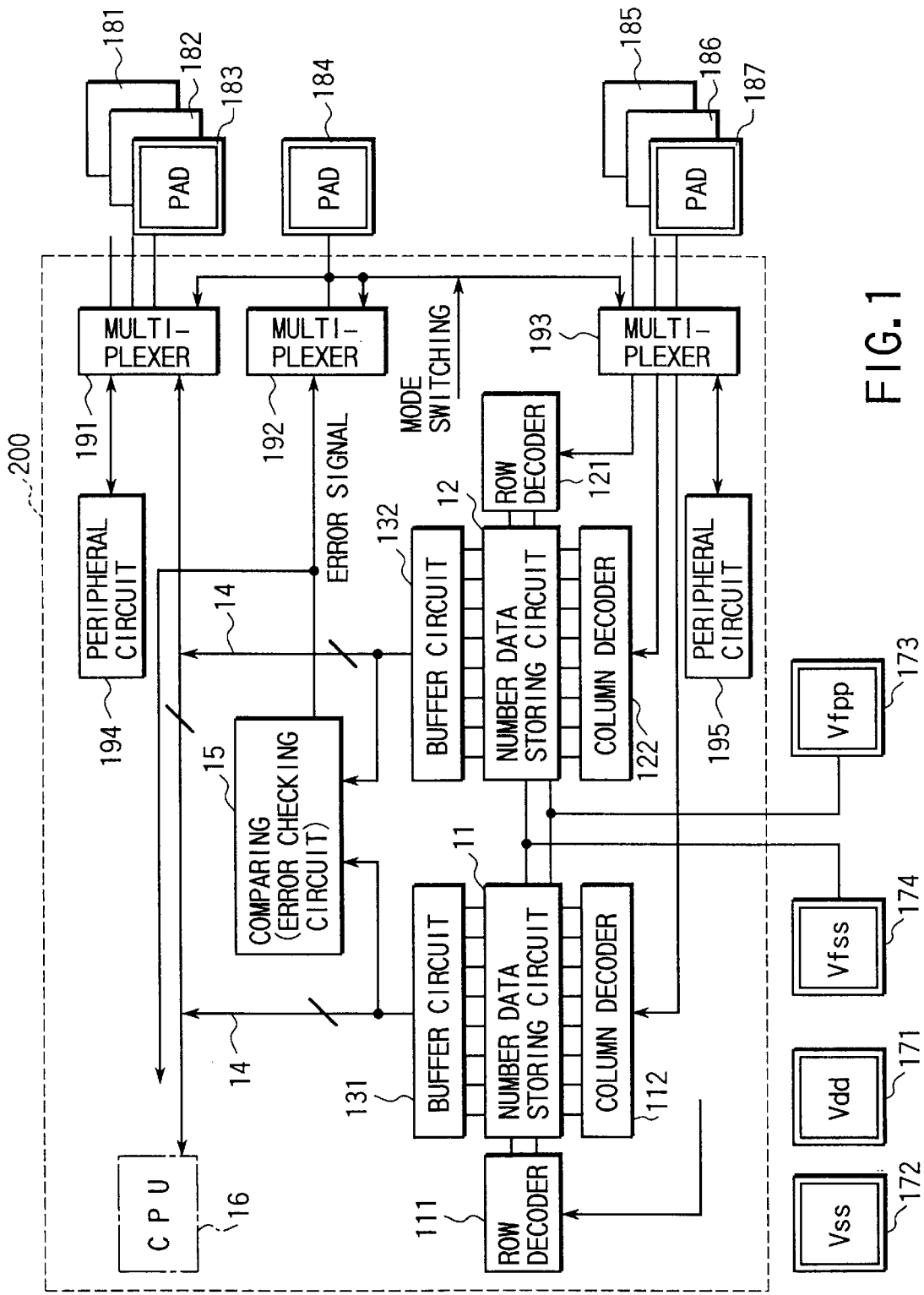
FIG. 1 is a block diagram showing part of a one-chip microcomputer having an inherent number data storing circuit according to a first embodiment of this invention.

FIG. 1 shows part of a one-chip microcomputer having an inherent number data storing circuit according to a first embodiment of this invention.

A one-chip microcomputer 200 shown in FIG. 1 includes a number data storing circuit 11 constructed by ROM cells and storing inherent identification data such as number data and a dummy data storing circuit 12 constructed by destructive type ROM cells and storing dummy data which is exclusive with respect to the number data. Each of the ROM cells of the number data storing circuit 11 may be either a destructive type ROM cell or a non-destructive type ROM cell, but in this example, a destructive type ROM cell is used. Further, in this example, as the number data and dummy data, 8-bit data items of binary number are used.

Further, the one-chip microcomputer 200 shown in FIG. 1 includes a first row decoder 111 and a first column decoder 112 for selecting a ROM cell in the number data storing circuit 11, and a second row decoder 121 and a second column decoder 122 for selecting a ROM cell in the dummy data storing circuit 12.

Further, the one-chip microcomputer 200 shown in FIG. 1 includes a buffer circuit 131 for outputting data read out from the number data storing circuit 11 to an internal data bus 14, and a buffer circuit 132 for outputting data read out from the dummy data storing circuit 12 to the internal data bus 14.

In addition, the one-chip microcomputer 200 shown in FIG. 1 includes a comparing circuit (error check circuit) 15 for comparing and checking data items (which are data items read out to the respective internal data buses 14 via the buffer circuits 131 and 132 in this example) read out from the two data storing circuits 11 and 12 and outputting the result of comparison to the exterior of the chip and the system side. In this case, the comparing circuit (error checking circuit) 15 outputs "0" as an error signal if the readout data is correct and outputs "1" as the error signal if the readout data is abnormal. An error detection signal to be supplied to the system side is not limited to one but a plurality of error detection signals may be supplied.

The system side includes a CPU 16 connected to the internal data bus 14. The CPU 16 has a determining function for determining whether a desired data writing process is completed or not by reading storage data items read out from the two data storing circuits 11, 12 via the internal bus 14 and a control function for fetching a comparison output from the comparing circuit 15 and generating a preset control output based on the fetched comparison output.

The one-chip microcomputer 200 shown in FIG. 1 includes a power supply pad 171 to which a power supply voltage Vdd is applied from the exterior and a ground pad 172 coupled to an external ground potential Vss and the ground pad 172 is connected to a power supply line and ground line (not shown) on the semiconductor chip.

As the ROM cell of destructive mode, a ROM element of current fusible fuse type is used in this example and a write voltage applying pad 173 and ground pad 174 which are each commonly connected to the two data storing circuits 11, 12 are provided to control current fusion of the ROM element of current fusible fuse type.

Further, as groups of pads connected to external terminals (not shown), for example, a group of pads 181 to 183 used for data transfer to and from the internal data bus 14 and peripheral circuit, a pad 184 used for outputting the comparison output of the comparing circuit 15 to the exterior and a group of pads 185 to 187 used for address signal transfer to and from the address buffers for the two data storing circuits 11, 12 and other circuits are provided.

Multiplexers 191 to 193 function to select peripheral circuits 194, 195 and other circuits which are to be connected to the groups of pads 181 to 187 according to the switching of the normal operation/"test mode".

In this case, at the time of "test mode", the comparison output of the comparing circuit 15 is output to the pad 184 and address signals supplied to the group of pads 185 to 187 are supplied to the address buffers for the two data storing circuits 11, 12.

The "test mode" is specified when data is written into the two data storing circuits 11, 12, when storage data items are read out from the two data storing circuits 11, 12 to determine whether or not a desired writing process is completed after the above data writing operation, or when storage data items are read out from the two data storing circuits 11, 12 at the time of initial determination made after the power supply is turned ON, for example.

Figure 2:
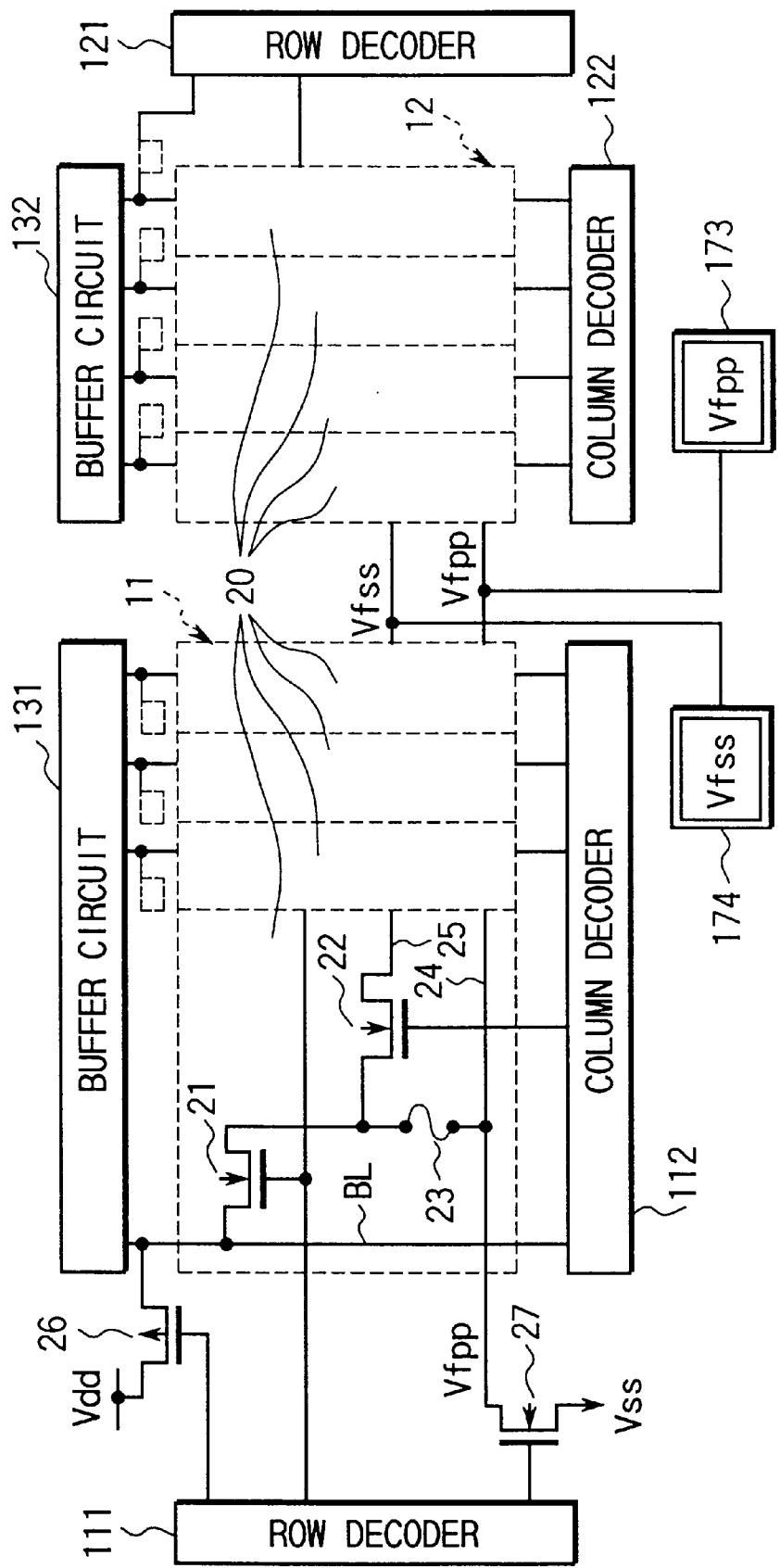
FIG. 2 is a circuit diagram showing one example of circuit portions of 4 bits when ROM elements of current fusible fuse type are used in each of two data storing circuits shown in FIG. 1.

FIG. 2 shows one example of circuit portions of 4 bits when ROM elements of current fusible fuse type are used in each of the two data storing circuits 11, 12 shown in FIG. 1. In FIG. 2, a 1-bit portion of each of ROM cells 20 includes two NMOS transistors (readout MOS transistor 21, write MOS transistor 22), and a current fusible type fuse element (for example, a polysilicon fuse) 23. That is, a bit line BL on each of the columns of the data storing circuits 11, 12 is connected to the drain of the readout MOS transistor 21 and the source of the readout MOS transistor 21 is connected to a Vfpp line 24 which is a power supply line for writing via the fuse element 23 and connected to a Vfss line 25 which is a ground potential line via the drain-source path of the write MOS transistor 22.

The Vfpp line 24 and Vfss line 25 are formed to extend in the row direction of the two data storing circuits 11, 12, the Vfpp line 24 is connected to the write voltage applying pad 173, and the Vfss line 25 is connected to the ground pad 174. In this case, it is possible to omit the ground pad 174 and connect the Vfss line 25 to the ground pad 172.

Further, the drain-source path of a PMOS transistor 26 is connected between the bit line and the first power supply node to which the readout power supply voltage Vdd is applied and one end of the Vfpp line 24 is connected to the ground potential (Vss) node via the drain-source path of a clamp NMOS transistor 27.

The gate of the PMOS transistor 26, the gate of the readout transistor 21 and the gate of the clamp transistor 27 are supplied with output signals from a corresponding one of the row decoders 111, 121 for the data storing circuits 11, 12 and the gate of the write transistor 22 is supplied with an output signal from a corresponding one of the column decoders 112, 122 for the data storing circuits 11, 12.

In the circuit of FIG. 2, when the operation for writing data into the ROM cell 20 is effected, the PMOS transistor 26, readout transistor 21 and clamp transistor 27 are controlled to be set into the OFF state by the row decoder 111 or 121, a ground potential Vfss is applied to the Vfss line 25 via the ground pad 174 or 172, a write power supply voltage Vfpp is applied to the Vfpp pad 173, and the write transistor 22 on a column selected by the column decoder 112 or 122 is controlled to be set into the ON state/OFF state according to write data "1"/"0".

If the write transistor 22 is set into the ON state, a fusing current flows in the fuse element 23 connected to the write transistor set in the ON state to melt the fuse, and data "1" is thus written, for example.

On the other hand, if the write transistor 22 is set into the OFF state, a fusing current does not flow in the fuse element 23 connected to the write transistor set in the OFF state so that the fuse will not be melted, and data "0" is thus written, for example.

The operations of writing complementary data into the two data storing circuits 11, 12 may be effected simultaneously or sequentially for the two data storing circuits 11, 12.

When the operation for reading out data from the ROM cell 20 is effected, the write transistor 22 is controlled to be set into the OFF state by the column decoder 112 or 122, the Vfpp pad 173 is set in the open state, and the PMOS transistor 26, readout transistor 21 and clamp transistor 27 are controlled to be set into the ON state by the row decoder 111 or 121.

As a result, the potential of the bit line BL is set to the "H"/"L" level according to the melted state/non-melted state of the fuse element 23 and readout data "1"/"0" is supplied to the buffer circuit 131 or 132.

Figure 3:
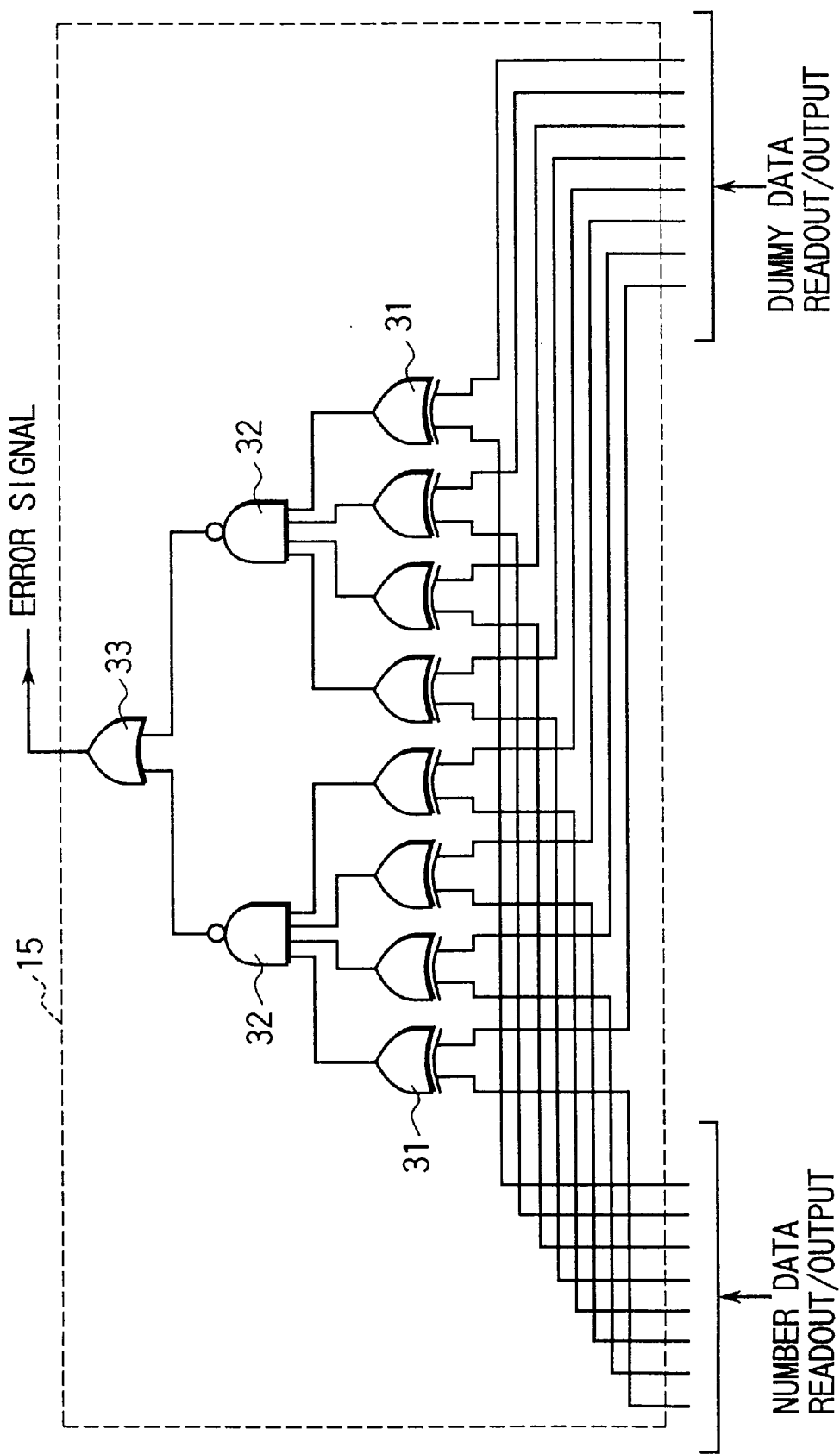
FIG. 3 is a circuit diagram showing one example of a comparing circuit shown in FIG. 1.

FIG. 3 is a circuit diagrams showing one example of the comparing circuit (error checking circuit) 15 shown in FIG. 1. The error checking circuit includes eight exclusive OR circuits 31 each of which is supplied with one bit of 8-bit number data and a corresponding one bit of 8-bit dummy data, two NAND circuits 32 each of which is supplied with four bits from a corresponding one of two groups each including four of the eight exclusive OR circuits and an OR circuit 33 to which outputs of the two NAND circuits are input.

Figure 4:
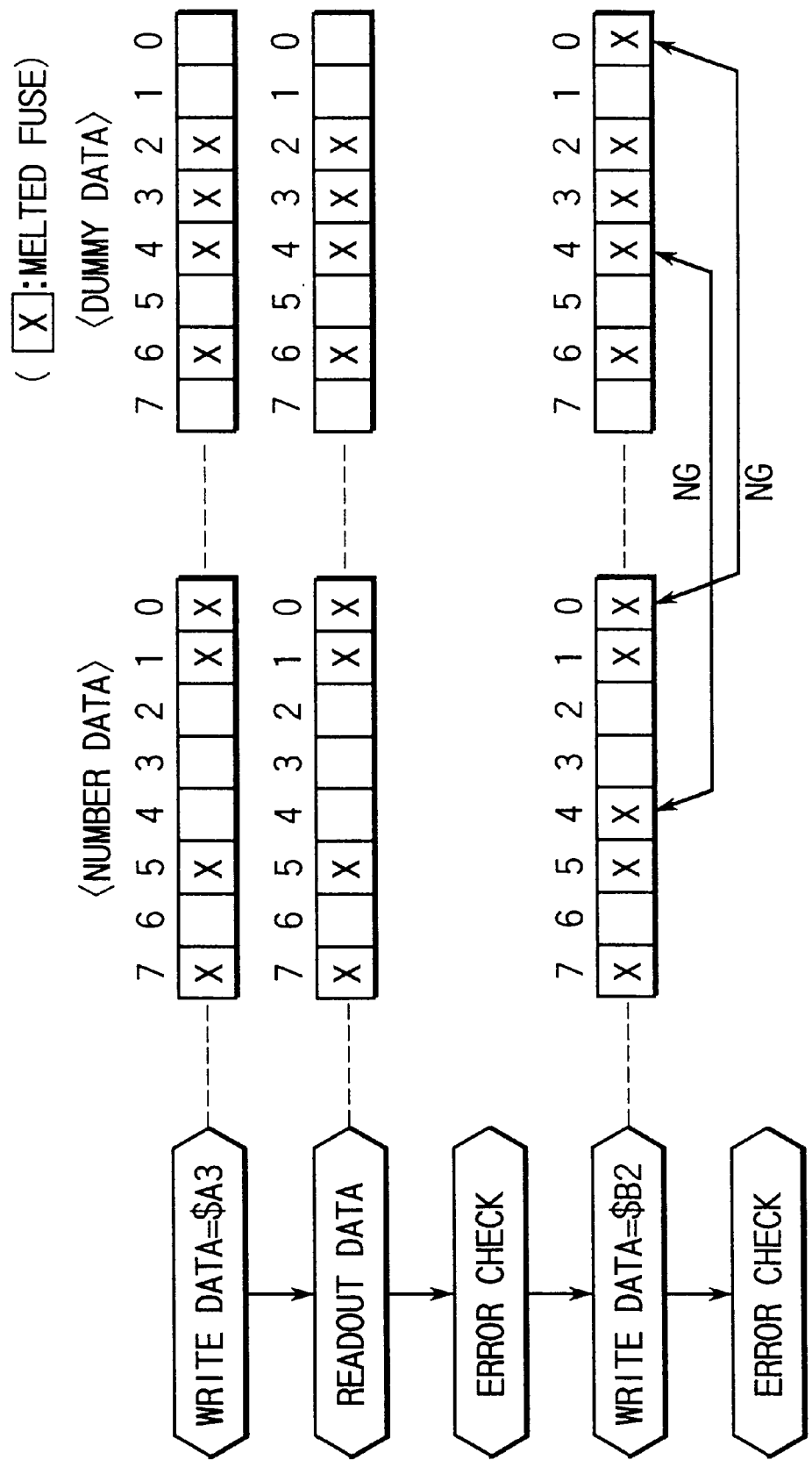
FIG. 4 is a diagram for illustrating one example of the operation of writing, reading out and dishonestly rewriting 8-bit data of binary number with respect to the two data storing circuits shown in FIG. 1.

FIG. 4 illustrates one example of the initial writing operation, readout operation and dishonest rewriting operation for 8-bit data of binary number operation after shipment with respect to the two data storing circuits 11, 12 shown in FIG. 1.

When it is supposed to write "A3" (8-bit data of two digits when represented by a hexadecimal number) as correct number data at the time of initial writing operation, number data "10100011" is written into the number data storing circuit 11 and dummy data "01011100" which is exclusive with respect to the above number data is written into the dummy data storing circuit 12.

At the time of readout operation, data items read out from the two data storing circuits 11, 12 are always compared with each other and checked by the error checking circuit 15 and the result of comparison (in this example, an error signal indicating the logical NOT of the total logical AND of the exclusive logical OR outputs of corresponding bits) is output to the system side.

In this case, if readout data items from the two data storing circuits 11, 12 are correct, the result of comparison (error signal) becomes "0". On the other hand, if "B2" (number data is "101100010" and exclusive dummy data is "01001101) is written as dishonest number data by the dishonest rewriting (additional writing) operation after shipment, readout data items from the two data storing circuits 11, 12 are determined as abnormal data items (NG) and the result of comparison (error signal) becomes "1" since the fuse elements 23 which are destroyed (melted) according to the bits of the data A3 written by the initial writing operation are kept in the same state, an additional fuse element or elements 23 are melted according to the bits of the dishonest inherent number data "B2" and thus the total number of melted fuse elements is increased in the two data storing circuits 11, 12.

When the system side receives the error signal "1", the system side recognizes that the dishonest rewriting operation has been effected and takes a necessary safety measure by switching the operation mode, interrupting or restricting the operation of the whole system, for example.

That is, in the semiconductor device described above, each bit of the inherent number data is represented by use of a complementary combination of storage data items (number data and dummy data) of a ROM cell pair making one set by use of one ROM cell in each of the two data storing circuits 11, 12 and a ROM element of at least one of the paired ROM cells of one set is set in the destroyed state when correct number data is correctly written.

With this construction, if number data is dishonestly rewritten after shipment of the semiconductor device, both of the paired ROM cells of one set corresponding to rewritten bit data are set into the destroyed state, and as a result, the result (error signal) of the comparing operation for comparing and checking data items from the two data storing circuits 11, 12 at the time of readout becomes "1".

Therefore, according to the above-described semiconductor device, it is extremely difficult to rewrite the inherent number after shipment, it is possible to inform the system side that the dishonest rewriting has been effected and suggest that a safety measure be taken at the time of readout if the inherent number is dishonestly rewritten by any chance, and thus it becomes possible to suppress the possibility of an applied system device using the semiconductor device to be dishonestly used.

Figure 5:
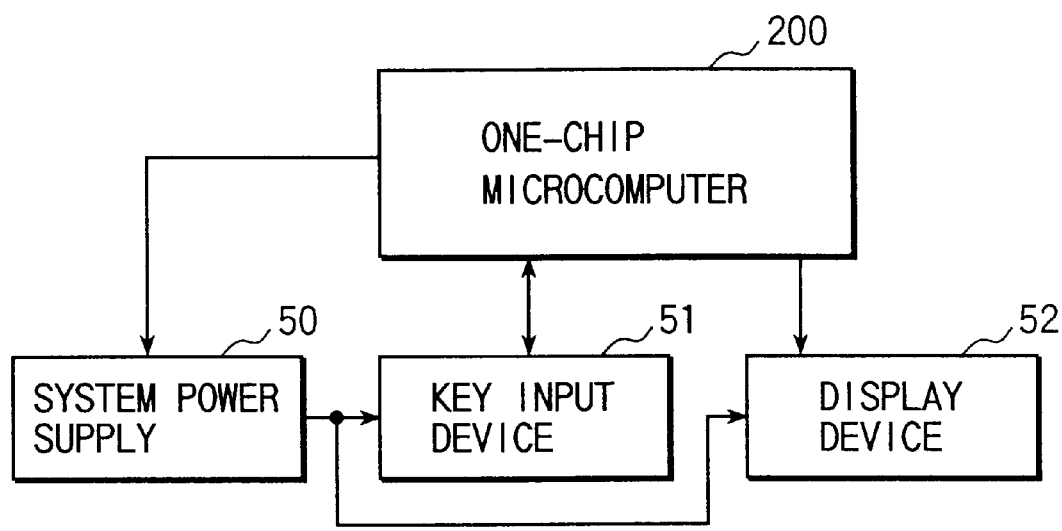
FIG. 5 is a block diagram showing one example of an applied system device of the one-chip microcomputer shown in FIG. 1.

For example, in an applied system device shown in FIG. 5, if an input/output device such as a key input device 51 and display device 52 controlled by the one-chip microcomputer and a system power supply 50 for supplying power supply voltages to the above devices are provided, dishonest use of the device can be prevented by using dishonest-use preventing means for setting up a state in which the operation for fetching a key input signal of the key input device is inhibited, controlling the display device to display an error, or effecting the control operation to interrupt supply of the power supply voltage from the system power supply when the comparison output of the comparing circuit indicates that data is dishonestly written into the identification data storing circuit at the time of initial determination made after the power supply of the semiconductor device is turned ON.

Further, an applied system device which is required to contain inherent identification data is not limited to a mobile communication terminal device such as a portable telephone, but can be applied to a communication terminal device used in an electronic settlement system using an internet and the application field thereof is wide.

The ROM cell of destructive mode is not limited to the current fusible fuse type ROM element, but a laser beam fusible fuse type ROM element can be used. In addition, another type of irreversible ROM element of destructive type can be used and the same effect can also be attained in this case.

Further, in a case where the semiconductor device is received into a ceramic type package, there is a possibility that the package portion may be broken and the content (ON/OFF state) of the ROM storage element of the semiconductor device in the package may be decoded by visual observation, for example.

Figure 6A:
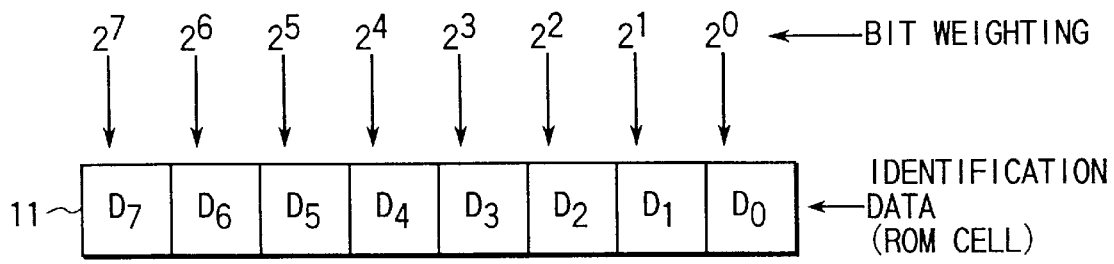
FIGS. 6A and 6B are data patterns showing the order of arrangement of the ROM cells according to the present invention.
Figure 6B:
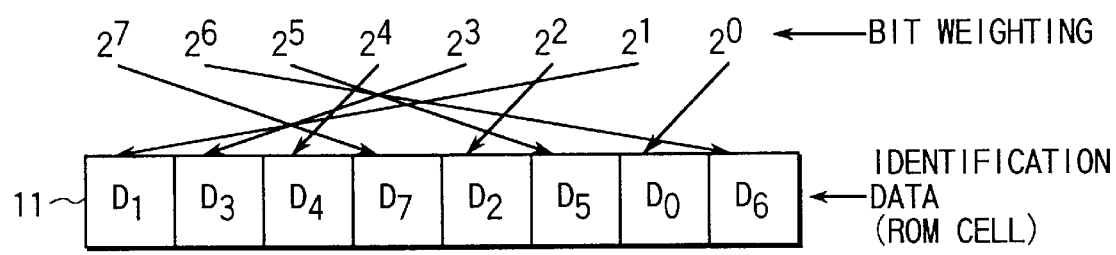

Therefore, as shown in FIG. 6B it is desirable to make it difficult to decode the content by setting the order of arrangement of the ROM cells corresponding to the bits of the identification data in the identification data storing circuit 11 on the pattern layout to an irregular order different from the bit weighting order (the order of arrangement from a ROM cell corresponding to MSB to a ROM cell corresponding to LSB). In this case, FIG. 6A shows the order of arrangement of the ROM cells corresponding to the bits of the identification data in the identification data storing circuit 11 on the pattern layout, is the same as the bit weighting order.

Figure 7:
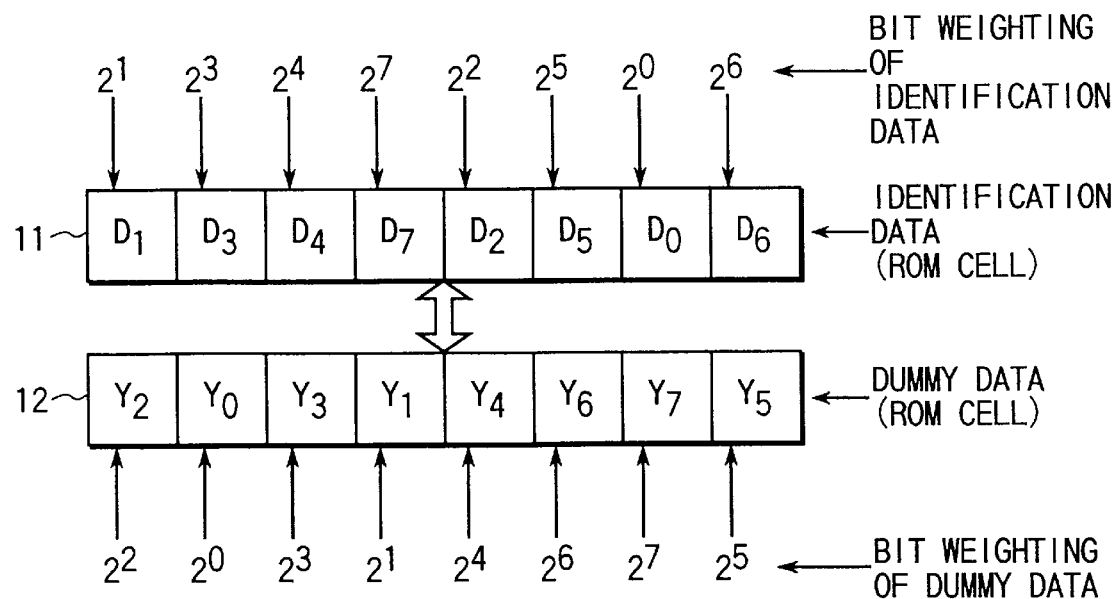
FIG. 7 is data pattern showing the order of arrangement of the ROM cells according to the present invention.

Further, as shown in FIG. 7 it is desirable to make it difficult to decode the content by making the order of arrangement of the ROM cells corresponding to the bits of the identification data in the identification data storing circuit 11 on the pattern layout different from the order of arrangement of the ROM cells corresponding to the bits of the dummy data in the dummy data storing circuit on the pattern layout.

Figure 8:
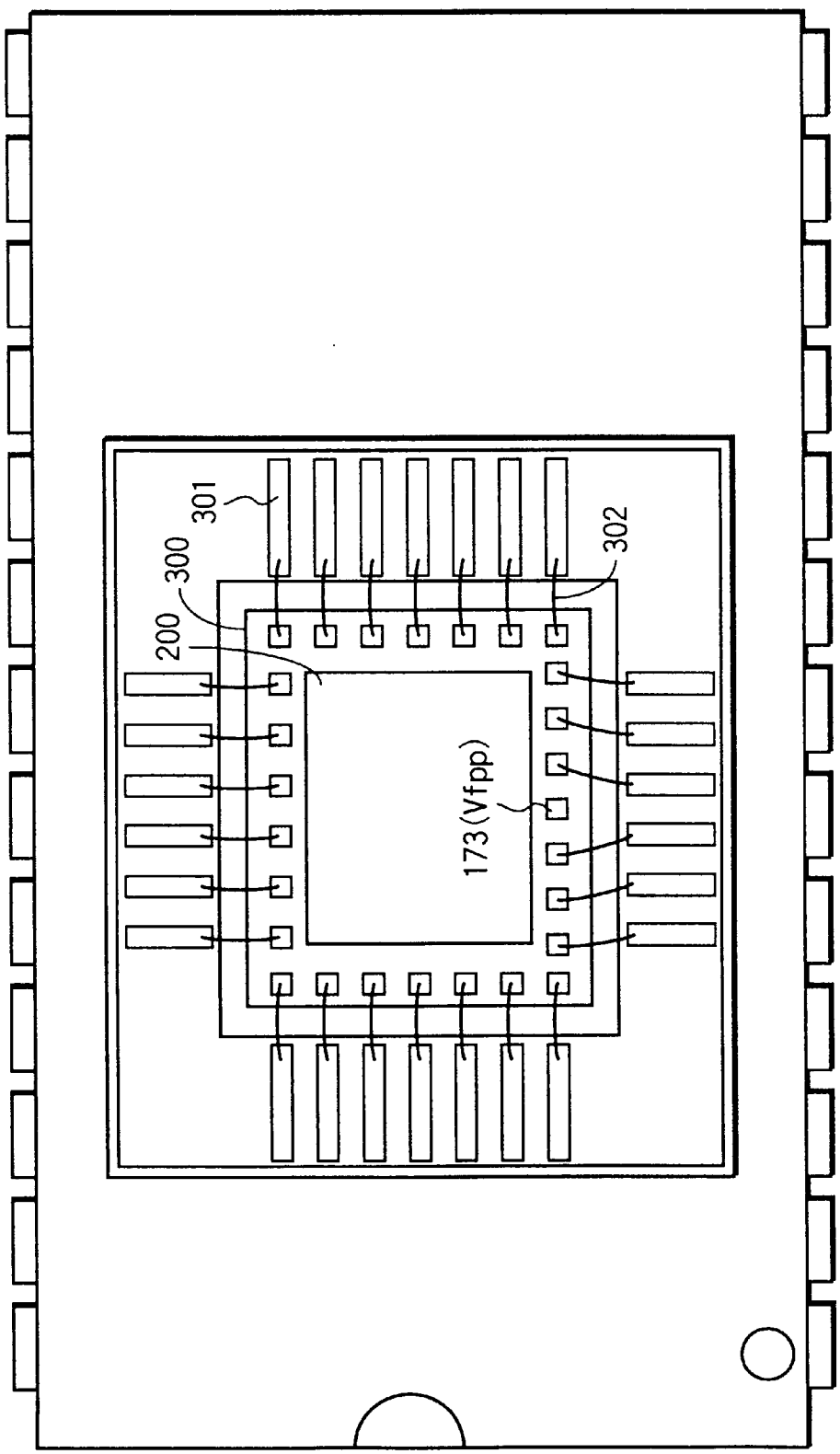
FIG. 8 is a circuit layout showing the semiconductor device according to the present invention.

Also, as shown in FIG. 8, the rewriting operation for the semiconductor device from the exterior can be made difficult by electrically isolating at least part (for example, Vfpp pad 173) of the pad group to which signals necessary for writing data into the inherent number data storing circuit 11 are supplied from the external terminal 301 in a state where the semiconductor chip 300 is assembled and set in the package (for example, connection of the pad to the external terminal 301 by wire bonding 302 is not made).

The data rewriting can also be made difficult when a non-destructive mode such as an EPROM is used instead of the destructive type ROM element of the inherent number data storing circuit 11.

Also, as well as shown in FIG. 8, the rewriting operation for the semiconductor device from the exterior can be made difficult by electrically isolating at least part (for example, Vfpp pad 173) of the pad group to which signals necessary for writing data into the inherent number data storing circuit 11 are supplied from the external terminal 301 in a state where the semiconductor chip 300 is assembled and set in the package (for example, connection of the pad to the external terminal 301 by wire bonding 302 is not made).

As described above, according to the semiconductor device of this invention having the inherent number storing circuit, it is extremely difficult to dishonestly rewrite the inherent number after shipment, it is possible to inform the system side that the dishonest data rewriting operation has been effected and suggest to take a safety measure if the inherent number is dishonestly rewritten by any chance, and thus it is possible to suppress the possibility of the applied system of the semiconductor device to be dishonestly used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A semiconductor device comprising:
    an identification data storing circuit having ROM cells, for storing identification data inherent to a semiconductor chip;
    a dummy data storing circuit having destructive type ROM cells, for storing dummy data which is exclusive with respect to the identification data; and
    a comparing circuit for comparing and checking data items read out from said two data storing circuits and outputting the result of comparison, wherein said result of comparison indicates that the dummy data is not exclusive with respect to the identification data.

2. A semiconductor device according to claim 1, wherein the ROM cells in said identification data storing circuit include destructive type ROM cells.

3. A semiconductor device according to claim 2, wherein the destructive type ROM cells include current fusible fuse type ROM elements.

4. A semiconductor device according to claim 2, wherein the destructive type ROM cells include ROM elements of laser beam fusible fuse type.

5. A semiconductor device according to claim 1, wherein the ROM cells in said identification data storing circuit are arranged on a layout pattern in an order different from a bit weighting order of identification data in said identification data storing circuit.

6. A semiconductor device according to claim 1, wherein the ROM cells in said identification data storing circuit and the ROM cells in said dummy data storing circuit have different orders of arrangement on pattern layouts.

7. A semiconductor device according to claim 1, further comprising a CPU for fetching storage data items read out from said two data storing circuits via an internal data bus.

8. A semiconductor device according to claim 7, wherein said CPU has a function of generating a preset control output based on a comparison output from said comparing circuit at the time of initial determination made after the power supply is turned ON.

9. A semiconductor device according to claim 1, further comprising a group of pads which are supplied with signals necessary for writing data into said two data storing circuits.

10. A semiconductor device according to claim 1, comprising:
    said comparing circuit outputting said result to indicate that improper writing of said identification data has occurred.

11. A semiconductor device comprising:
    a semiconductor device which includes an identification data storing circuit having ROM cells, for storing identification data inherent to a semiconductor chip, a dummy data storing circuit having destructive type ROM cells, for storing dummy data which is exclusive with respect to the identification data, and a comparing circuit for comparing and checking data items read out from said two data storing circuits and outputting the result of comparison, wherein said result of comparison indicates that the dummy data is not exclusive with respect to the identification data;
    a group of pads to which signals necessary for writing data into said two data storing circuits are supplied; and
    a package member having external terminals, for packaging said semiconductor device assembled with said group of pads therein;
    wherein said semiconductor device and part of said pad group are electrically isolated from the external terminals.

12. A semiconductor device according to claim 11, comprising:
    said comparing circuit outputting said result to indicate that improper writing of said identification data has occurred.

13. A semiconductor device comprising:
    a semiconductor device which includes an identification data storing circuit having ROM cells, for storing identification data inherent to a semiconductor chip, a dummy data storing circuit having destructive type ROM cells, for storing dummy data which is exclusive with respect to the identification data, and a comparing circuit for comparing and checking data items read out from said two data storing circuits and outputting the result of comparison, wherein said result of comparison indicates that the dummy data is not exclusive with respect to the identification data;
    a key input device controlled by said semiconductor device; and
    dishonest-use preventing means for preventing the operation of fetching a key input signal of said key input device when a comparison output of said comparison circuit indicates that dishonest writing is effected for said identification data storing circuit at the time of initial determination made after the power supply of said semiconductor device is turned ON.

14. A semiconductor device comprising:
    a semiconductor device which includes an identification data storing circuit having ROM cells, for storing identification data inherent to a semiconductor chip, a dummy data storing circuit having destructive type ROM cells, for storing dummy data which is exclusive with respect to the identification data, and a comparing circuit for comparing the checking data items read out from said two data storing circuits and outputting the result of comparison, wherein said result of comparison indicates that the dummy data is not exclusive with respect to the identification data; and
    a display device controlled by said semiconductor device.

15. A semiconductor device according to claim 14, comprising:
    said comparing circuit outputting said result to indicate that improper writing of said identification data has occurred.

16. A semiconductor device comprising:
    a semiconductor device which includes an identification data storing circuit having ROM cells, for storing identification data inherent to a semiconductor chip, a dummy data storing circuit having destructive type ROM cells, for storing dummy data which is exclusive with respect to the identification data, and a comparing circuit for comparing and checking data items read out from said two data storing circuits and outputting the result of comparison, wherein said result of comparison indicates that the dummy data is not exclusive with respect to the identification data;
    an input/output device connected to said semiconductor device;
    a system power supply for supplying a power supply voltage to said semiconductor device and input/output device; and
    dishonest-use preventing means for preventing the operation of fetching a key input signal of said key input device when a comparison output of said comparison circuit indicates that dishonest writing is effected for said identification data storing circuit at the time of initial determination made after the power supply of said semiconductor device is turned ON.

* * * * *